(12) United States Patent  
Vukovic et al.

(10) Patent No.: US 8,438,641 B2  
(45) Date of Patent: May 7, 2013

(54) SECURITY PROTOCOL PROCESSING FOR ANTI-REPLAY PROTECTION

(75) Inventors: Vojislav Vukovic, Campbell, CA (US); Brian Vanderwarn, Maple Grove, MN (US); Nikola Radovanovic, Los Altos, CA (US); Ephrem Wu, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 230 days.

(21) Appl. No.: 12/980,489

(22) Filed: Dec. 29, 2010

(65) Prior Publication Data

US 2012/0174216 A1 Jul. 5, 2012

(51) Int. Cl.  
G06F 7/04 (2006.01)

(52) U.S. Cl.  
USPC .................. 726/22; 713/189; 726/13; 726/23

(58) Field of Classification Search ............ 726/13, 726/22, 23  
See application file for complete search history.

(56) References Cited

U.S. PATENT DOCUMENTS

| | | | |
|---|---|---|---|
| 6,262,929 B1 | 7/2001 | Miyatake et al. | |
| 7,237,262 B2* | 6/2007 | Lahti et al. | 726/13 |
| 2004/0062267 A1 | 4/2004 | Minami et al. | |
| 2004/0205332 A1 | 10/2004 | Bouchard et al. | |
| 2007/0294509 A1* | 12/2007 | Sauer | 712/14 |
| 2008/0288872 A1* | 11/2008 | Burkley et al. | 715/723 |
| 2009/0158417 A1 | 6/2009 | Khanna et al. | |
| 2012/0042096 A1 | 2/2012 | Wu | |

OTHER PUBLICATIONS

Internet Engineering Task Force (IETF) Requests for Comment (RFC) 2402, "IP Authentication Header", IETF (1998).  
Internet Engineering Task Force (IETF) Requests for Comment (RFC) 2401, "Security Architecture for the Internet Protocol", IETF (1998).  
Internet Engineering Task Force (IETF) Requests for Comment (RFC) 4303, "IP Encapsulating Security Payload (ESP)", IETF (2005).

* cited by examiner

Primary Examiner — Christopher Brown

(57) ABSTRACT

Described embodiments provide a network processor that includes a security protocol processor to prevent replay attacks on the network processor. A memory stores security associations for anti-replay operations. A pre-fetch module retrieves an anti-replay window corresponding to a data stream of the network processor. The anti-replay window has a range of sequence numbers. When the network processor receives a data packet, the security hardware accelerator determines a value of the received sequence number with respect to minimum and maximum values of a sequence number range of the anti-replay window. Depending on the value, the data packet is either received or accepted. The anti-replay window might be updated to reflect the receipt of the most recent data packet.

13 Claims, 6 Drawing Sheets

FIG. 2
200

ANTI-REPLAY WINDOW

| WORD INDEX | SEQUENCE NUMBER INDEX | | | | | | | |
|---|---|---|---|---|---|---|---|---|
| 0 | 0 | 0 | 0 | 0 | ⋮ | 0 | 0 | 0 |
| 1 | 0 | 0 | 0 | 0 | ⋮ | 0 | 0 | 0 |
| 2 | 0 | 0 | 0 | 0 | ⋮ | 0 | 0 | 0 |
| 3 | 0 | 0 | 0 | 0 | ⋮ | 0 | 0 | 0 |
| 4 | 0 | 0 | 0 | 0 | ⋮ | 0 | 0 | 0 |
| 5 | 0 | 0 | 0 | 0 | ⋮ | 0 | 0 | 0 |
| 6 | 0 | 0 | 0 | 0 | ⋮ | 0 | 0 | 0 |
| 7 | 0 | 0 | 0 | 0 | ⋮ | 0 | 0 | 0 |
| BIT INDEX | 63 | 62 | ⋮ | 3 | 2 | 1 | 0 | |

600

SECURITY PROTOCOL PROCESSING FOR ANTI-REPLAY PROTECTION

CROSS-REFERENCE TO RELATED APPLICATIONS

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/782,379 filed May 18, 2010, Ser. No. 12/782,393 filed May 18, 2010, Ser. No. 12/782,411 filed May 18, 2010, and Ser. No. 12/854,315 filed Aug. 11, 2010, the teachings of all of which are incorporated herein in their entireties by reference.

BACKGROUND OF THE INVENTION

1. Field of the Invention

The present invention relates to communication systems, in particular, to data packet security using anti-replay protection.

2. Description of the Related Art

Internet Protocol Security (IPsec) is a set of protocols for securing Internet Protocol (IP) communications by authenticating and encrypting IP packets in a data stream. IPsec includes protocols for establishing mutual authentication and negotiation of cryptographic keys, which might protect data flows between two or more host devices (e.g., computers or servers), between a pair of security gateways (e.g., routers or firewalls), or between a security gateway and a host device. The IPsec protocol is officially specified by the Internet Engineering Task Force (IETF) in a series of Requests for Comment (RFC). For example, IETF RFC 2402 (1998) defines anti-replay protection for the IP Authentication Header protocol, which secures IP data flows against a security breach by an adversary inserting or replaying packets in the data flow. IETF RFC 2401 (1998) and IETF RFC 4303 (2005) further describe general anti-replay steps for IPsec. RFC 2401 specifies the base architecture for IPsec compliant systems, and RFC 4303 describes a specific protocol, the Encapsulating Security Payload (ESP) protocol, which provides an anti-replay service. Although generally described herein in relation to the IPsec protocol, other network protocol standards, such as Secure Real-time Transport Protocol (SRTP), Transport Layer Security (TLS) and Secure Socket Layer (SSL) also define similar anti-replay protection.

In general, as described in RFC 2402, IPsec authentication provides anti-replay protection by assigning a unique sequence number to each encrypted packet. In the IPsec protocol, the sequence number is, for example, a 64-bit number. Security association ("SA") anti-replay is a security service in which a receiving device can reject old or duplicate packets to protect itself against replay attacks. The transmitting device assigns a sequence number to each packet in a data stream in monotonically increasing order. In a packet-switched network, individual packets of a sequence of packets in the same data stream might take different paths between the transmitting device and the receiving device and, thus, packets might not arrive in the same order in which they were transmitted. Therefore, the receiving device tracks sequence numbers that it has received, and discards packets with a repeated sequence number. Only the first packet received with a specific sequence number will be accepted. Since the sequence number is permitted to be a large number (e.g., 64 bits), the receiver does not track all the sequence numbers it has received, instead, tracking only those sequence numbers that are within a sliding anti-replay window.

For example, a "position" of the sliding anti-replay window is determined based on the highest sequence number, X, that the receiving device has received. If N is the anti-replay window width, the receiving device will track whether it has received packets having sequence numbers from a low value of X−(N−1) through a high value of X, thus defining the anti-replay window between X−(N−1) and X. Any packet with a sequence number value less than X−(N−1) is discarded. The "position" of the window slides as the value of X changes as packets are received having higher sequence numbers. Common values of N are 32 and 64, although some devices support up to 1024.

Anti-replay windows for internet security protocols are commonly implemented using a bitmap. As packets are received, the receiver may check a bitmap to determine if the sequence number has already been received. In some cases, a bit shift operation may be used to slide the contents of the anti-replay window when higher sequence numbers are received. In other cases, circular bit manipulation implements anti-replay detection to effectively shift the bits of a large bitmap. For example, a receiver utilizing circular bit manipulation may receive a sequence number greater than X, and may respond by changing the beginning and end points of the sequence number bitmap, rather than sliding the entire anti-replay window. Circular manipulation of the anti-replay window might increase system throughput for large anti-replay windows.

Processing systems commonly perform anti-replay processing checks using software in a host processor or firmware in a network processor. Anti-replay window size may be limited due to processing requirements of anti-replay protection. Decreased anti-replay window size may result in valid packets being discarded because they arrived out of order and with a sequence number outside of the window. Anti-replay functionality may also be implemented in a hardware accelerator. For example, the accelerator may include a register used to store an anti-replay widow. The hardware accelerator for sliding windows may also include a barrel shifter to slide the anti-replay window based on a received sequence number.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a network processor that includes a security protocol processor to prevent replay attacks on the network processor. A memory stores security associations for anti-replay operations. A pre-fetch module retrieves an anti-replay window corresponding to a data stream of the network processor. The anti-replay window has a range of sequence numbers. When the network processor receives a data packet, the security hardware accelerator determines a value of the received sequence number with respect to minimum and maximum values of a sequence number range of the anti-replay window. Depending on the value, the data packet is either received or accepted. The anti-replay window might be updated to reflect the receipt of the most recent data packet.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows an exemplary anti-replay window in accordance with exemplary embodiments of the present invention;

DETAILED DESCRIPTION

In accordance with embodiments of the present invention, a network processor is provided that tracks sequence numbers of received data packets and provides variable anti-replay windows of sizes larger than the typical 32, 64 or 1024 sequence numbers. Security associations for anti-replay operations are stored in memory and an anti-replay window corresponding to a data stream of the network processor is retrieved. The anti-replay window has a range of sequence numbers, and when the network processor receives a data packet, a received sequence number value is compared with minimum and maximum values of a sequence number range of the anti-replay window. Depending on the value, the data packet is either received or accepted, and the anti-replay window possibly updated to reflect the receipt of the most recent data packet.

Figure 1:
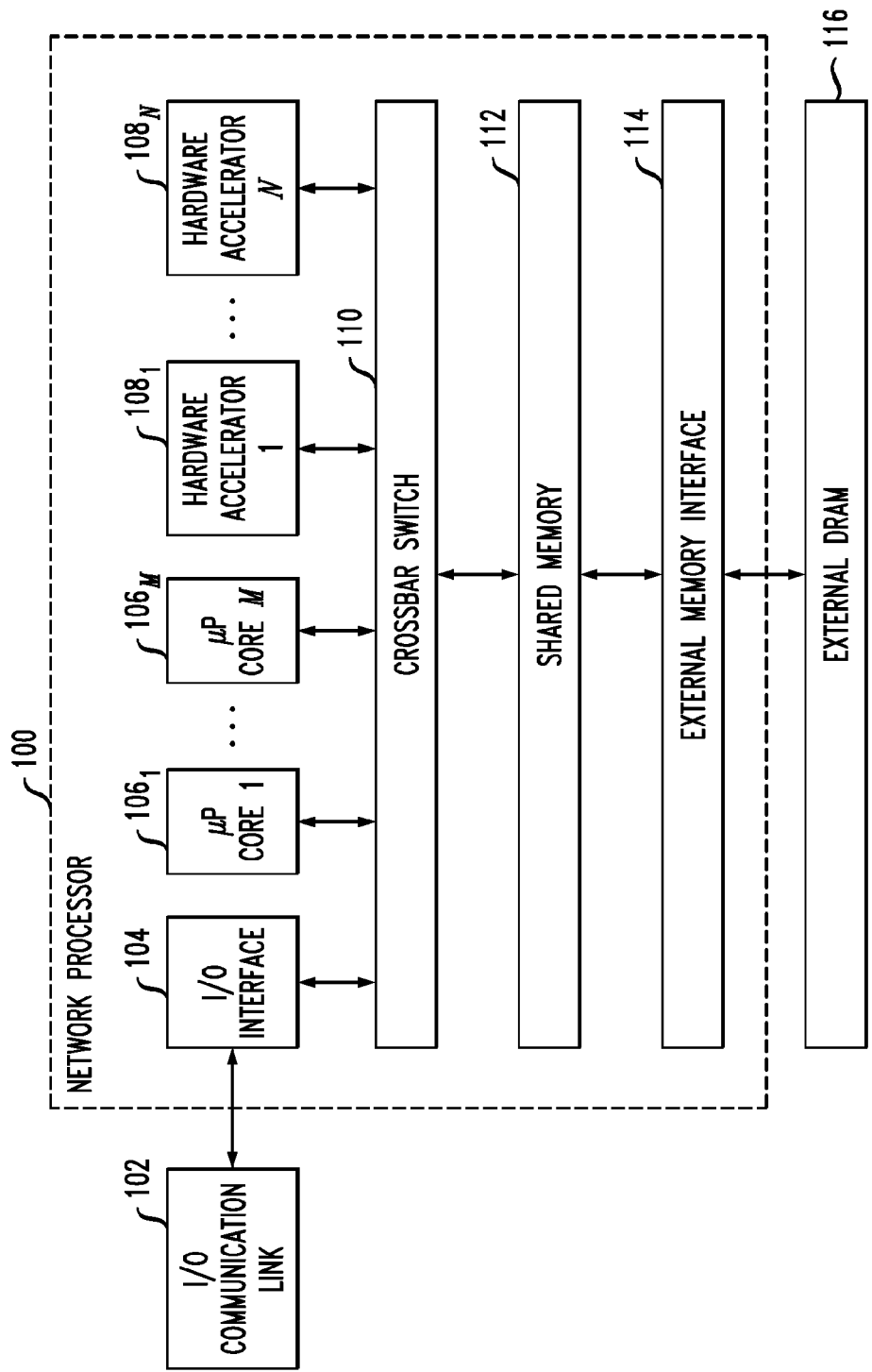
FIG. 1 shows a block diagram of a network processor operating in accordance with exemplary embodiments of the present invention.

FIG. 1 shows a block diagram of an exemplary single-chip network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled to a switch system 110 that is then coupled to shared memory 112. In embodiments of the present invention, one or more of the various μP cores 106 and hardware accelerators 108 might be employed as a security protocol processor (e.g. (SPP) 300 described subsequently with respect to FIG. 3) to implement one or more security protocols, such as IPsec.

I/O interface 104 might typically be implemented in hardware connecting network processor 100 to one or more external devices through I/O communication link 102. I/O communication link 102 might generally be employed for communication with one or more external devices, such as a computer system or a networking device, interfacing with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112.

In embodiments of the present invention, shared memory 112 is a conventional memory operating as a cache and might be allocated or subdivided. For example, shared memory 112 might include one or more First-in First-out (FIFO) queues that might be dynamically allocated to the various μP cores 106 and hardware accelerators 108. External memory interface 114 couples shared memory 112 to external DRAM 116 to provide off-chip storage of data not needed by the various μP cores 106 and hardware accelerators 108 to free space in shared memory 112. The μP cores and hardware accelerators might interact with each other as described in related U.S. patent applications Ser. Nos. 12/782,379, 12/782,393, and 12/782,411, all filed May 18, 2010. Switch 110, as shown in the FIG., might be a non-blocking crossbar switch such as described in related U.S. patent applications Ser. No. 12/430,438 filed Apr. 27, 2009, Ser. No. 12/729,226 filed Mar. 22, 2010, and Ser. No. 12/729,231 filed March 22, 2010.

As shown in FIG. 1, one or more data packets are transmitted from a transmitting device (not shown) to network processor 100, via communication link 102. Network processor 100 might receive data packets from one or more active data streams concurrently. As described herein, where communication link 102 is coupled to a packet switched network, transmitted data packets might arrive at network processor 100 in an order different from the transmission order since, for example, each data packet might be routed over a different path through the network, or various nodes in the network might delay one or more packets for quality-of-service (QoS) requirements. Thus, as described herein, the transmitter appends a sequence number to each data packet indicating the order in which the packet was sent. Network processor 100 receives a stream of data packets corresponding to one or more data streams from communication link 102. I/O interface 104 might parse the received data packet and provide the received data packet, via switch 110, to a buffer in shared memory 112. The sequence number corresponding to the received data packet might be compared to an anti-replay window corresponding to the data stream of the received packet. The anti-replay window might be stored in a portion of shared memory 112 dedicated to storing security parameters, or the anti-replay window might be stored in a separate security memory dedicated only to storing security parameters and accessible only by those ones of μP cores 106 and hardware accelerators 108 that perform security processing.

FIG. 2 shows exemplary anti-replay window 200 in accordance with embodiments of the present invention. As described herein, received data packets of one or more active data streams of network processor 100 might be tracked with an anti-replay window such as shown in FIG. 2. A relatively large anti-replay window bit vector might be segmented into multiple words in memory (e.g., shared memory 112 or a separate security memory). For example, an anti-replay window of width, N, equal to 512, might be stored as 8 data words of 64 bits each, such as shown in FIG. 2, although other anti-replay window widths, numbers of data words, and number of bits per data word are possible. For example, an anti-replay window having width N=65536 might be stored as 512 128-bit data words. For clarity, this specification will discuss only the exemplary anti-replay window shown in FIG. 2 having width N=512 and employing 8 64-bit data words, although the invention described herein is not so limited. As shown in FIG. 2, substantially all of the bits in anti-replay window 200 are initially set to zero, indicating that network processor 100 has not yet received any data packet sequence numbers. Thus, anti-replay window 200 is initially set to track a maximum sequence number equal to N (512 in the exemplary case of FIG. 2), and a minimum sequence number of 1. For the described embodiment, bit index 63 of data word 7 (bit 204 in the FIG.) represents the maximum sequence number (512) and bit index 0 of data word 0 (bit 206 in the FIG.) represents the minimum sequence number (1).

The anti-replay window 200 might also be a wrapping window, where a wrapping window is treated as a circular buffer of bits. When a data packet is received, the least significant bits of the received data packet's sequence number might be extracted and used as a pointer to the anti-replay window 200. The size of the pointer might be determined by the size of the anti-replay window. Accessing the anti-replay window in this manner might allow the window to be accessed and advanced without having to shift the window bits. For example, suppose the maximum sequence number received by anti-replay window 200 is located at word 2, bit index 1 (bit 208 in the FIG.) of the anti-replay window. In this case the bit at word 2, bit index 1 would be set equal to 1. If anti-replay window 200 is a wrapping window, the minimum sequence number is a neighboring bit of the maximum sequence number, and therefore the minimum sequence number within the window might be located at data word 2, bit index 2 (bit 210 in the FIG.). If a new maximum sequence number is received at data word 3, bit index 0 (bit 212 in the FIG.), then the new minimum sequence number is, therefore, located at word 3, bit index 1 (bit 214 in the FIG.). In response to the new maximum sequence number, the bits in between the new maximum sequence number and the older maximum sequence number at set equal to logic 0 because they have not been received. As illustrated above, by changing the pointer targeted bits from anti-replay 200 might be accessed and values within anti-replay 200 might be advanced. Therefore, anti-replay window 200 might be accessed without having to shift window bits. Although not shown in anti-replay window 200, in operation, network processor 100 might store the value of the maximum received sequence number, and also might maintain a pointer indicating where the "wrap" occurs in the anti-replay window between the maximum sequence number and the minimum sequence number.

Figure 3:
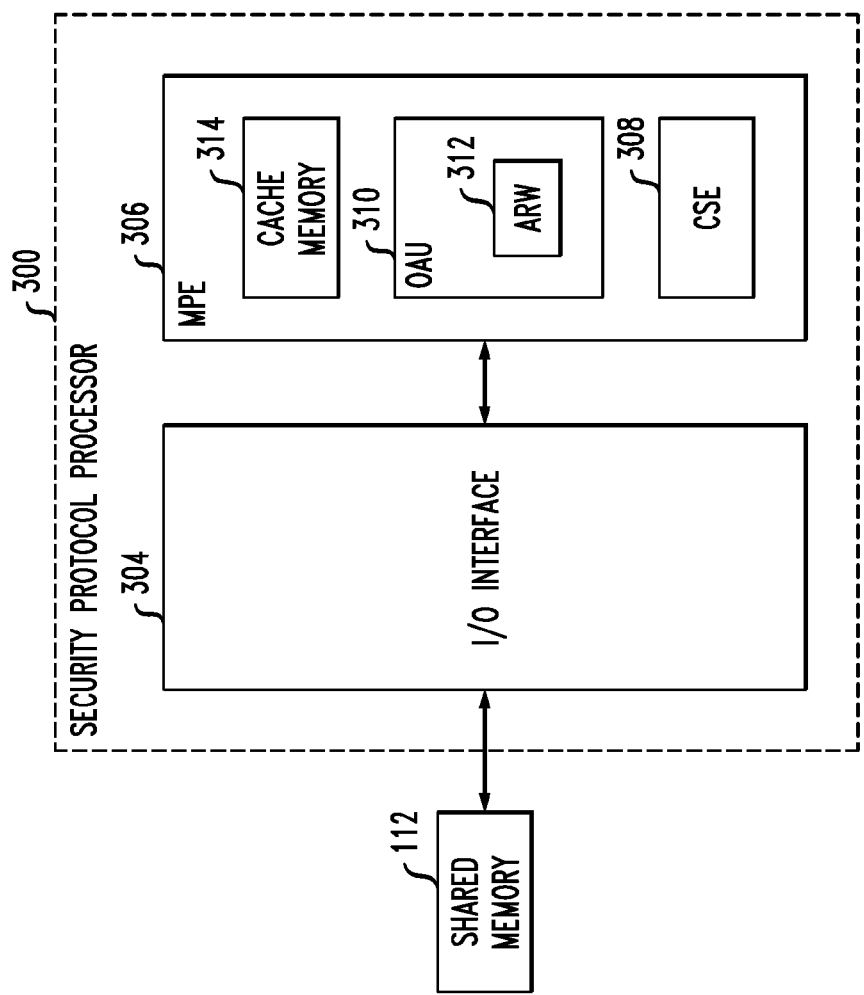
FIG. 3 shows a block diagram of an exemplary Security Protocol Processor (SPP) employed by the network processor of FIG. 1.

FIG. 3 shows a block diagram of security protocol processor (SPP) 300 employed by network processor 100 in accordance with embodiments of the present invention. In some embodiments, SPP 300 is implemented as a programmable, multi-protocol, security hardware accelerator associated with, for example, one of hardware accelerators 108. SPP 300 might be compatible with a variety of security protocols, such as IPsec, 3GPP Network Access Security, SRTP and TRS/SSL. In embodiments of the present invention, SPP 300 receives data packets from shared memory 112. The packet might contain, for example, a pointer to a corresponding security context. The security context, also referred to as a "security association," is a construct that associates security services with the active data packet to be protected. The security context may include, among other information, cypher and hash keys. The packet might also contain information about the packet, such as its sequence number. In some embodiments security contexts are temporarily stored in cache memory 314 that is local to SPP 300, and security contexts might include an anti-replay window. Cache memory 314 might be a level 1 (L1) cache, and might also be employed to store the anti-replay window with the maximum sequence number for each active data stream. Embodiments of the present invention might employ a first local cache for storing security contexts of active data streams, and a second local cache for storing anti-replay windows of active data streams.

As shown in FIG. 3, SPP 300 might include I/O Interface 304, Multi-Protocol Engine (MPE) 306, and Crypto Service Engine (CSE) 308. SPP 300 might be firmware driven, for example, to provide flexibility in handling various security protocols and changing standards, although software or combination software/firmware implementations are possible. SPP 300 provides encryption/decryption capabilities and anti-replay processing. I/O Interface 304 might be employed as an interface block to communicate with network processor 100 via I/O communication link 302. SPP 300 includes CSE 308 that, for example, contains cyphers and hashers for encryption and integrity checking Embodiments of SPP 300 employ MPE 306 for a variety of purposes such as anti-replay processing. In some embodiments, MPE 306 is idle until a security task for SPP 300 arrives from I/O interface 304. On arrival of a security task, MPE 306 receives information about the incoming packet header from I/O interface 304. The incoming packet header is referred to as a "meta header." MPE 306 also fetches the associated security context from cache memory 314. MPE 306 might contain one or more processors such as Output Assembly Unit (OAU) Processor 310. Based on the meta header and the security context, MPE 306 processors compute desired parameters, fetch the packet data from I/O interface 304 and prepare data for CSE 308 to encrypt and hash. OAU processor 310 might take the encryption and hash results from CSE 308 and create the SPP 300 output.

MPE 306 includes OAU processor 310 and cache memory 314. OAU processor 310 might format data from the output of CSE 308 and provide the data to the primary data output of SPP 300. In addition to data formatting, OAU processor 310 might perform anti-replay checking. For example, OAU processor 310 might contain Anti-Replay Window (ARW) module 312 (employing the exemplary structure of FIG. 2) and execute anti-replay firmware instructions.

An exemplary implementation of the ARW algorithm stores a state in cache memory 314 of MPE 306 to indicate the maximum sequence number previously received. Cache memory 314 might also store an ARW vector of bits for the most recently received sequence numbers and a count that indicates the size of the window. Exemplary sizes for the anti-replay window might include 64, 128, 256, 512, and 1024 bits.

Figure 4:
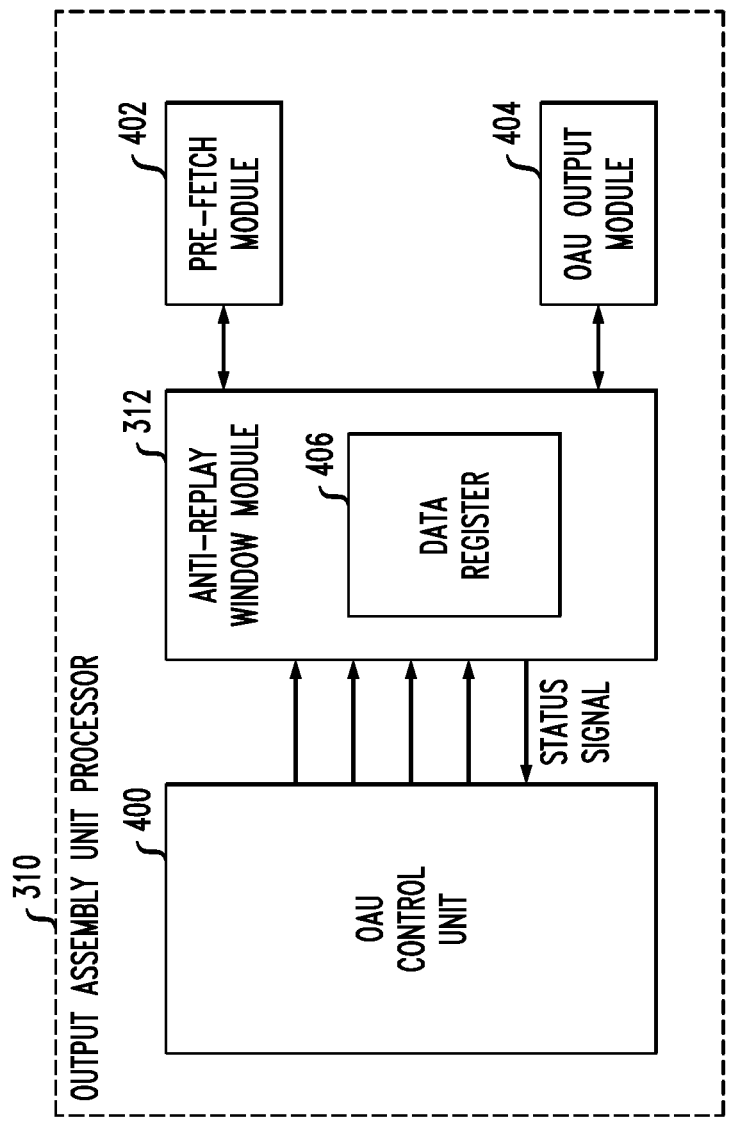
FIG. 4 shows a block diagram of an exemplary Output Assembly Unit (OAU) processor of the SPP of FIG. 3.

FIG. 4 shows an exemplary OAU processor 310 for anti-replay checking Example connections to ARW module 312 are also shown in FIG. 4. For example, Pre-fetch module 402, preferably embodied as a FIFO queue, stores the existing anti-replay window that is read from (e.g., security context) cache memory 314 for each received packet. In some embodiments, OAU control unit 400 issues instructions such as anti-replay instructions. For example, OAU control unit 400 might offload anti-replay processing to ARW module 312 by sending instruction codes and parameters to ARW module 312. ARW module 312 might be embodied as a hardware accelerator that receives the instruction codes and manipulates and updates the anti-replay window. OAU control unit 400 might read a bit port (e.g., port BUSY shown on FIG. 6) on ARW module 312 to determine when to dispatch a new command. For example, if OAU control unit 400 receives a busy signal it will not send an instruction.

When a packet is received, OAU control unit 400 might execute a classification instruction to classify the sequence number of the received packet. The classification instruction classifies the current sequence number by comparing it to the maximum sequence number and the ARW size to determine if the current sequence number is within, ahead or behind the window. If the current sequence number is behind the window, the packet is rejected and the ARW vector is not updated. The classification instruction stores its results in data register 406 so that OAU control unit 400 might dispatch future instructions so that ARW module 312 can interrogate the results.

In certain embodiments, if the current received sequence number is within the anti-replay window, ARW module 312 moves the bit of the anti-replay window corresponding to the received sequence number to data register 406 and sets the target bit in the ARW vector. A subsequent branch instruction requires OAU processor 310 to test the target bit in data register 406 and determine whether to accept or reject the packet. The updated ARW vector is then passed to OAU output module 404 from ARW module 312. ARW module 312 modifies the anti-replay fields of cache memory 314.

In certain embodiments, if the current received sequence number is ahead of the anti-replay window, OAU control unit 400 executes an advance instruction to ARW module 312 and ARW module 312 advances the anti-replay window. The previous maximum sequence number is updated to the current sequence number and the ARW vector is modified to set the bit targeted by the current sequence number. For example, all bits between the previous maximum sequence number and the current sequence number might be cleared to zero. The new maximum sequence number and the modified ARW vector are written back to cache memory 314 through OAU output module 404.

Figure 5:
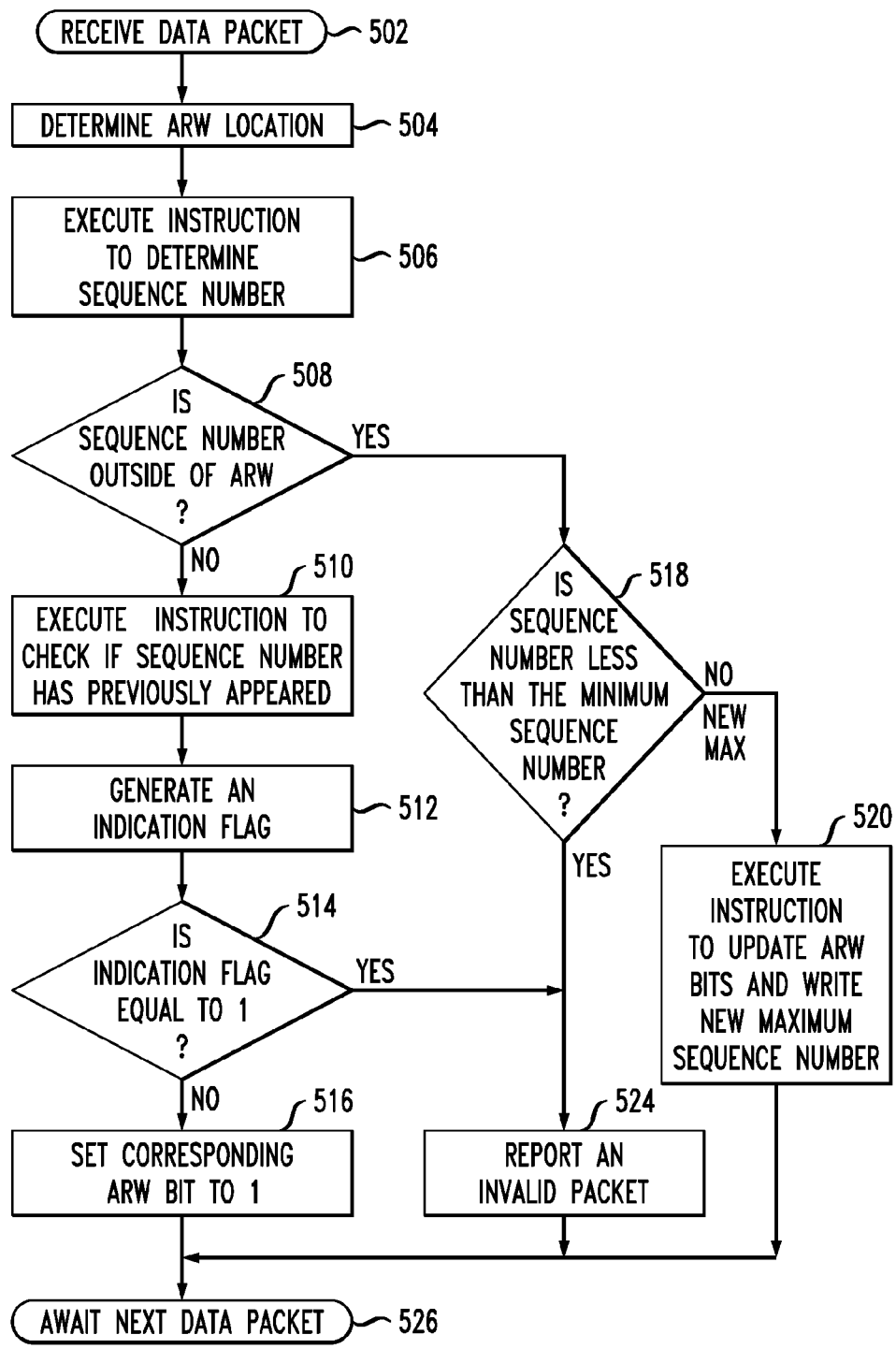
FIG. 5 shows a flow diagram of a process for anti-replay processing in accordance with embodiments of the present invention.

FIG. 5 shows a flow diagram of anti-replay process 500 in accordance with embodiments of the present invention. At step 502, a data packet for an active data stream is received by SPP 300. At step 504, the anti-replay window location corresponding to the data stream is determined The location might indicate the specific security context and the address within cache memory 312. For example, each packet received by SPP 300 might have an associated security context stored in cache memory 314. The instruction at step 504 sets the location within the corresponding security context for write back of the anti-replay window data. This location is determined before updates to the security context are made, such as advancing the anti-replay window.

At step 506, OAU control unit 400 executes an instruction to determine the sequence number of the received data packet. At step 508, a test of, for example, OAU control unit 400 determines whether the position of the sequence number of the received data is outside of the ARW. The test might be implemented with an instruction that reads the existing maximum sequence number and the anti-replay window width, and classifies the current packet sequence number depending on its relative position to the anti-replay window. Based on the position of the sequence number, OUA control unit 400 might issue an instruction to ARW module 312. In some embodiments, the anti-replay window is defined by the maximum sequence number that has been received on the current security context and a size value that determines the window's width. The current packet sequence number might be ahead of the ARW, within the ARW or behind the ARW. The results of the sequence number position determination might be written into data register 406. If the current packet's sequence number is behind the window, data register 406 indicates a "less than" result. If the sequence is within the window, data register 406 indicates an "equal to" result. If the sequence is ahead of the window, the data register 406 indicates a "greater than" result.

If test of step 508 determines the sequence number is within the anti-replay window range, processing continues to step 510. At step 510, ARW module 312 checks whether the received sequence number has previously been received by SPP 300. ARW module 312 accesses the bit in the anti-replay window corresponding to the current packet's sequence value. A pointer is constructed from the sequence number, and the sequence number's corresponding bit might be identified by extracting some number of the least significant bits of the current packet's sequence number. An exemplary anti-replay window that consists of four 64 bit words might use eight bits to construct the pointer, where the six least significant bits identify a bit within the word, and two bits identify the word. For example, the bit within anti-replay window 200 might be identified using the word and bit within the word as indices pointing to the location within anti-replay window 200. At step 512, after the bit is extracted, ARW module 312 generates an indication flag and it is stored in data register 406. For example, if the bit corresponding to the received sequence number had already been set, the indication flag is set to a predetermined flag state such as logic '1'. At step 514, a test determines whether the generated indication flag is equal to logic '1'. If the test of step 514 determines that the generated indication flag is equal to logic '1', a packet having that sequence number was already received by network processor 100. Therefore, the received data packet is a replayed packet and, at step 524, the received data packet is discarded as a replayed and invalid packet, and the process advances to step 526. If the test of step 514 determines that the generated indication flag not equal to logic '1', and the bit corresponding to the received sequence number was not set, the received packet is a newly received packet and, at step 516, ARW module 312 updates anti-replay data word such that the bit corresponding to the received sequence number is set, indicating that the sequence number has been received. The modified word of the anti-replay window might be forwarded to the data out register in OAU output module 404 so that it can be updated in the security context. At step 526, anti-replay process 500 is idle until a next data packet is received.

If the test of step 508 determines the sequence number is not within the window range, then, at step 518, a test determines whether the received sequence number is above the maximum threshold of the anti-replay window, or below the minimum threshold of the anti-replay window. At step 518, if the test determines that the received sequence number is above the maximum threshold of the anti-replay window, processing continues to step 520. At step 520, OAU control unit 400 communicates an instruction and ARW module 312 advances the anti-replay window based on the current packet's sequence number. The maximum sequence number from the packet's security context is replaced with the current sequence number, and the anti-replay window is updated. For example, the bit in the vector indicated by the current sequence number might be set to one and all bits between the current sequence number and the previous maximum sequence number might be reset to zero. The new maximum sequence number and the modified anti-replay window might be sent to the OAU output module 404 so that these values might be updated in the security context. From step 520 the process advances to step 526, where anti-replay process 500 is idle until a next data packet is received.

At step 518, if the test determines that the received sequence number is below the minimum threshold of the anti-replay window, processing continues to step 524. At step 524, the received data packet is discarded as an out-of-date packet. Processing then continues to step 526. At step 526, anti-replay process 500 is idle until a next data packet is received.

In embodiments of the present invention, steps 504, 506, 510, and 520 as described are initiated by OAU control unit 400. The OAU control unit 400 might control hardware in ARW module 312 by providing firmware instructions to accomplish these tasks. ARW module 312 provides feedback to OAU control unit 400 as to the execution of these instructions in status signals.

ARW module 312 might be embodied as a finite state machine that reacts to instructions received from OAU control unit 400. For example, ARW module 312 might be instructed to internally save the address of the anti-replay window and the maximum sequence number in cache memory 314. In certain embodiments, ARW module 312 might receive an instruction from OAU control unit 400 via a bus port such as a 3 bit bus port (e.g., CTRL bus port shown in FIG. 6). In one clock cycle, ARW module 312 might also receive parameters via bus ports (e.g, 64 bit bus ports such as BUS A, BUS B, and BUS C shown in FIG. 6). For example, if OAU control unit 400 sends an instruction to advance the anti-replay window, it might also supply ARW module 312 with the current sequence number, maximum sequence number, and the window width. To advance the anti-replay window, ARW module 312 might extract ARW pointers, such as pointers for the new maximum sequence number, as well as pointers to the first and last sequence numbers that must be set to indicate that they have not been received.

Figure 6:
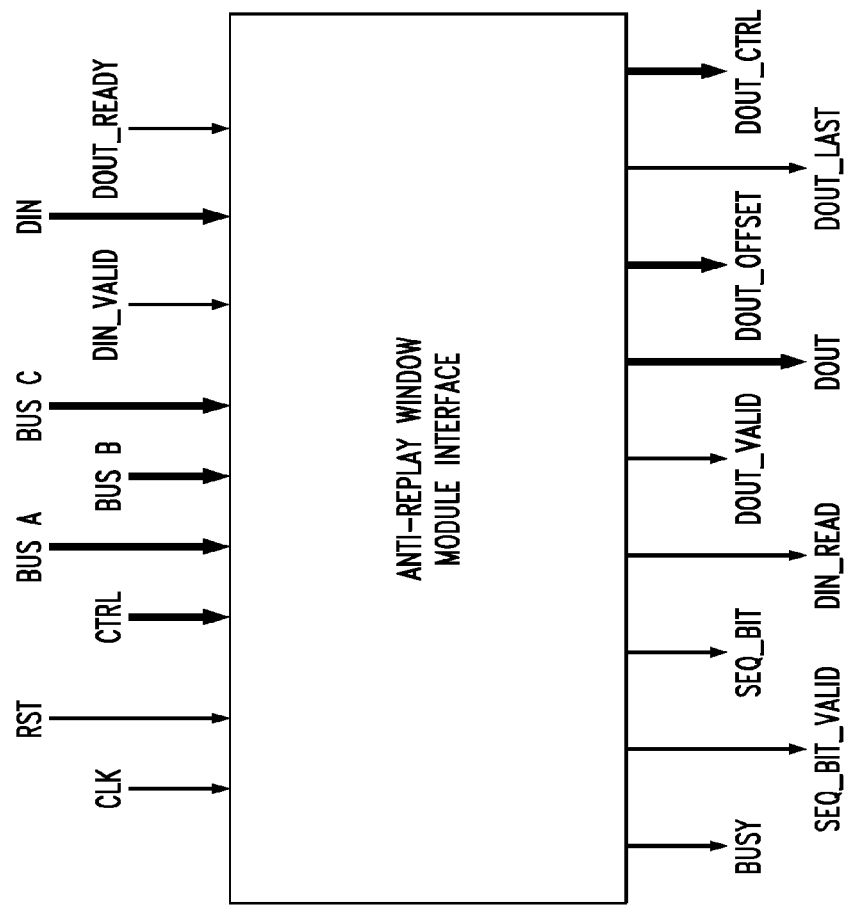
FIG. 6 shows an exemplary ARW Module of the SPP of FIG. 3.

To advance the anti-replay window, certain embodiments have ARW module 312 send the new maximum sequence number during a second clock cycle. For example, ARW module 312 might utilize 64 bit bus ports and bit ports to send the maximum sequence number to OAU output module 404. The bus ports in ARW module 312 are not limited to 64 bits in the present invention, and bus ports and bit ports that might be used to send the maximum sequence number are shown in FIG. 6 (e.g, bit ports DOUT_VALID; DOUT_LAST and bus ports DOUT, DOUT_OFFSET, DOUT_CTRL). ARW module 312 might wait more clock cycles if OAU output module 404 cannot accept data. For example, OAU output module 404 might indicate to ARW module 312 that it is ready to receive data by setting a bit port to logic '1' (e.g., DOUT_READY in FIG. 6). OAU output module 404 might pass the received data to cache memory 314 to update the active security context.

To update the anti-replay window, certain embodiments use ARW module 312 to read each anti-replay data word one by one from pre-fetch module 402. For example, if ARW module 312 might read a bit port from pre-fetch module 402 set to logic '1' (e.g, DIN_VALID in FIG. 6) that indicates the anti-replay data word is valid. In response ARW module 312 might accept the anti-replay word via a bus port (e.g., DIN in FIG. 6) and set a bit port (e.g., DIN_READ in FIG. 6) to logic '1' to allow the next anti-replay word to become available to ARW module 312. When an anti-replay word is modified, ARW module 312 sends the new anti-replay word to OAU output module 404 via bus ports and bit ports. If a word is not modified by ARW module 312 it is discarded. To modify an anti-replay word, ARW module 312 might sequentially read input words from pre-fetch module 402 until the current word is found. After the word is found, ARW module 312 might extract the bit of the word and set the bit value to indicate that a sequence number has been received. After the bit value is set, ARW module 312 might send the modified word to OAU output module 404 via bus and bit ports.

FIG. 6 shows an embodiment of ARW module 312 with exemplary interconnections 600. In the example, bus ports CTRL, BUS A, BUS B, and BUS C might be the bus ports used by OAU control unit 400 to instruct ARW module 312 hardware. For example, the instruction to update anti-play window at step 520 might supply BUS A with the current received sequence number; BUS B with the maximum sequence number; and BUS C with the anti-replay window width. The CTRL bus might identify what instructions need to be carried out. ARW module 312 might provide OAU control unit 400 an extracted bit value corresponding to a sequence number via bit ports SEQ_BIT VALID and SEQ_BIT.

In FIG. 6, CLK and RST might be bit ports. In the example, the signal line labeled CLK might be the system clock and RST might reset ARW module 312 in one clock cycle. In the example, ports DOU_VALID, DOUT, DOUT_OFFSET, DOUT_LAST, and DOUT_CTRL might communicate with OAU output module 404 in order to update an anti-replay window or change a maximum sequence number. OAU output module 404 might use bit port DOUT_READY to provide an indication that it is ready to receive a modified data word. In some embodiments, a bit port (e.g., BUSY) provides OAU control unit 400 with an indication when ARW module 312 is not permitted to receive a new instruction. Bit port DIN_READ might provide a signal to notify pre-fetch module 402 so that ARW module 312 takes the current input data word. Pre-fetch module 402 might provide anti-replay words (e.g., 64 bit data words) to ARW module 312 using bit port DIN_VALID and bus port DIN. Embodiments of pre-fetch module 402 have FIFO functionality. Other modules besides ARW module 312 might read data from pre-fetch module 312, and therefore OAU processor 310 might control access to pre-fetch module 402.

A security protocol processor adapted to perform anti-replay operations in accordance with exemplary embodiments of the present invention provides for the following advantages. The security protocol processor architecture allows for dedicated firmware instructions to initiate anti-replay operations. The security protocol processor architecture is compatible with a variety of security protocols, and also allows for offloading of anti-replay tasks to one or more hardware accelerators, which minimizes processing time required for anti-replay operations. The wrapping anti-replay windows that utilize pointers allow for the support of efficient anti-replay operations with large anti-replay window sizes.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software may also be implemented as processes of circuits. Such circuits may be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here. It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of preventing replay attacks on a network processor coupled to a packet-switched network, the method comprising:

extracting, by a security processor of the network processor, a current sequence number of a data packet;

retrieving, to a memory of the security processor a wrapping anti-replay window corresponding to the data packet, wherein the wrapping anti-replay window comprises a range of sequence numbers and the range of sequence numbers comprises a first minimum sequence number having a position adjacent to a first maximum sequence number, wherein the wrapping anti-replay window comprises N bits, wherein the memory comprises R data words, each data word having a width W, wherein R*W=N, and wherein N, R, and W are positive integers:

determining, by the security processor, a pointer based on the current sequence number, wherein the pointer identifies a bit in the wrapping anti-replay window corresponding to the current sequence number;

classifying, by the security processor, the current sequence number depending on a relative position of the current sequence number to the range of sequence numbers;

storing, by the security processor, the classification in a data register;

reading, the security processor the classification from the data register, if the classification indicates that the current sequence number is greater than the first maximum sequence number:

shifting the wrapping anti-replay window; and accepting the data packet as a valid packet;

wherein the security processor is implemented as a hardware accelerator of the network processor, and wherein the steps of (i) shifting the anti-replay window and (ii) accepting the data packet as a valid packet are performed in a single clock cycle of the security processor.

2. The method of claim 1, further comprising:

if the classification indicates that the current sequence number is less than the first minimum sequence number, rejecting the data packet as an invalid packet.

3. The method of claim 1, further comprising:

if the classification indicates that the current sequence number is greater than the first minimum sequence number and less than the first maximum sequence number:

retrieving the bit from the wrapping anti-replay window corresponding to the pointer;

generating an indication flag based on the bit;

storing the indication flag in the data register;

reading the indication flag from the data register;

if the indication flag is equal to a predetermined flag state, rejecting the packet as an invalid packet; and if the indication flag is not equal to a predetermined flag state:

setting the wrapping anti-replay bit corresponding to the current sequence number so as to indicate a valid packet; and accepting the data packet as a valid packet.

4. The method of claim 1, wherein shifting the anti-replay window comprises:

writing a second maximum sequence number to the wrapping anti-replay window, wherein the second maximum sequence number has a position in the wrapping anti-replay window equivalent to x spots from the position of the first maximum sequence number, where x equals the first maximum sequence number subtracted from the second maximum sequence number; and setting x bits in the wrapping anti-replay window to indicate the sequence numbers corresponding to the x bits as not received, the x bits corresponding to the bits between the position of the first maximum sequence number and the second maximum sequence number.

5. The method of claim 1, wherein the method is implemented as steps executed by a system-on-chip (SoC) network processor.

6. A machine-readable, non-transitory storage medium, having encoded thereon program code, wherein, when the program code is executed by a machine, the machine implements a method of preventing replay attacks on a network processor coupled to a packet-switched network, the method comprising:
  extracting, by a security processor of the network processor, a current sequence number of a data packet;
  retrieving, to a memory of the security processor, a wrapping anti-replay window corresponding to the data packet, wherein the wrapping anti-replay window comprises a range of sequence numbers and the range of sequence numbers comprises a first minimum sequence number having a position adjacent to a first maximum sequence number, wherein the wrapping anti-replay window comprises N bits, wherein the memory comprises R data words, each data word having a width W, wherein R*W=N, and wherein N, R, and W are positive integers;
  determining, by the security processor, a pointer based on the current sequence number, wherein the pointer identifies a bit in the wrapping anti-replay window corresponding to the current sequence number;
  classifying, by the security processor, the current sequence number depending on a relative position of the current sequence number to the range of sequence numbers;
  storing by the security processor, the classification in a data register;
  reading, by the security processor, the classification from the data register,
  if the classification indicates that the current sequence number is greater than the first maximum sequence number:
    shifting the wrapping anti-replay window; and
    accepting the data packet as a valid packet;
  wherein the security processor is implemented as a hardware accelerator of the network processor, and wherein the steps of (i) shifting the anti-replay window and (ii) accepting the data packet as a valid packet are performed in a single clock cycle of the security processor.

7. The method of claim 6, further comprising:
  if the classification indicates that the current sequence number is less than the first minimum sequence number, rejecting the data packet as an invalid packet.

8. The method of claim 6, further comprising:
  if the classification indicates that the current sequence number is greater than the first minimum sequence number and less than the first maximum sequence number:
    retrieving the bit from the wrapping anti-replay window corresponding to the pointer;
    generating an indication flag based on the bit;
    storing the indication flag in the data register;
    reading the indication flag from the data register;
    if the indication flag is equal to a predetermined flag state, rejecting the packet as an invalid packet; and
    if the indication flag is not equal to a predetermined flag state:
      setting the wrapping anti-replay bit corresponding to the current sequence number so as to indicate a valid packet; and
      accepting the data packet as a valid packet.

9. The method of claim 6, wherein shifting the anti-replay window comprises:
  writing a second maximum sequence number to the wrapping anti-replay window, wherein the second maximum sequence number has a position in the wrapping anti-replay window equivalent to x spots from the position of the first maximum sequence number, where x equals the first maximum sequence number subtracted from the second maximum sequence number; and
  setting x bits in the wrapping anti-replay window to indicate the sequence numbers corresponding to the x bits as not received, the x bits corresponding to the bits between the position of the first maximum sequence number and the second maximum sequence number.

10. A network processor coupled to a packet-switched network, comprising:
  a security processor configured to perform anti-replay operations in response to a received data packet;
  a cache memory configured to storing security associations for anti-replay operations;
  the security processor configured to:
    retrieve, by a pre-fetch module of the security processor to the cache memory, an anti-replay window corresponding to the received data packet, wherein the wrapping anti-replay window comprises a range of sequence numbers and the range of sequence numbers comprises a wherein the wrapping anti-replay window comprises N bits, wherein the memory comprises R data words, each data word having a width W, wherein R*W=N and wherein N, R, and W are positive integers;
    extract a current sequence number of the received data packet;
    determine a pointer based on the current sequence number, wherein the pointer identifies a bit in the wrapping anti-replay window corresponding to the current sequence number;
    classify the current sequence number depending on us relative position to the range of sequence numbers;
    store the classification in a data register;
    read the classification from the data register;
    if the classification indicates that the current sequence number is greater than the first maximum sequence number, the control unit is further adapted to:
      shift the wrapping anti-replay window; and
      accept the data packet as a valid packet;
  wherein the security processor is implemented as a hardware accelerator of the network processor, and wherein the security processor is configured to shift the anti-replay window and accept the data packet as a valid packet in a single clock cycle of the security processor.

11. The network processor of claim 10, wherein:
  if the classification indicates that the current sequence number is less than the first minimum sequence number, the security processor is further configured to reject the data packet as an invalid packet.

12. The network processor of claim 10, wherein:
  if the classification indicates that the current sequence number is greater than the first maximum sequence number and less than the first maximum sequence number, the security processor is further configured to:
  retrieve the bit from the wrapping anti-replay window corresponding to the pointer;
  generate an indication flag based on the bit;
  store the indication flag in the data register;
  read the indication flag from the data register;

if the indication flag is set to a first value, reject the packet as an invalid packet;

otherwise, if the indication flag is set to a second value:
set the wrapping anti-replay bit corresponding to the current sequence number so as to indicate a valid packet; and
accept the data packet as a valid packet.

13. The network processor of claim 10, wherein the security processor is further configured to:

write a second maximum sequence number to the wrapping anti-replay window, wherein the second maximum sequence number has a position in the wrapping anti-replay window equivalent to x spots from the position of the first maximum sequence number, where x equals the first maximum sequence number subtracted from the second maximum sequence number; and setting x bits in the wrapping anti-replay window to indicate the sequence numbers corresponding to the x bits as not received, the x bits corresponding to the bits between the position of the first maximum sequence number and the second maximum sequence number.

\* \* \* \* \*